US006589904B1

(12) United States Patent
Iwasaki et al.

(10) Patent No.: US 6,589,904 B1
(45) Date of Patent: Jul. 8, 2003

(54) ACTIVATED CARBON AND METHOD FOR PRODUCING IT

(75) Inventors: Hideharu Iwasaki, Okayama-ken (JP); Nozomu Sugo, Okayama-ken (JP); Shushi Nishimura, Okayama-ken (JP); Yoshifumi Egawa, Okayama-ken (JP); Hajime Aoki, Okayama-ken (JP)

(73) Assignees: Kuraray Co., Ltd., Kurashiki (JP); Kuraray Chemical Co., Ltd., Bizen (JP)

( * ) Notice: Subject to any disclaimer, the term of this patent is extended or adjusted under 35 U.S.C. 154(b) by 0 days.

(21) Appl. No.: 09/712,953

(22) Filed: Nov. 16, 2000

(30) Foreign Application Priority Data

Nov. 16, 1999 (JP) .......................................... 11-325279
Nov. 19, 1999 (JP) .......................................... 11-329857
Mar. 17, 2000 (JP) ....................................... 2000-075809
Jul. 24, 2000 (JP) ....................................... 2000-221784

(51) Int. Cl.$^7$ .......................... H01M 4/88; B01J 21/18; B01J 20/02; B01D 24/00; H01G 9/00

(52) U.S. Cl. ...................... 502/180; 502/101; 502/416; 502/418; 502/423; 502/424; 502/425; 502/426; 502/427; 502/430; 502/432; 502/435; 502/437; 423/447.2; 423/447.3; 423/447.4; 423/447.5; 423/447.6; 423/447.7; 423/449.6; 210/348; 361/502

(58) Field of Search ................................ 502/180, 416, 502/418, 423–427, 430, 432, 435, 437; 423/447.2–447.7, 447.9, 449.6

(56) References Cited

U.S. PATENT DOCUMENTS

| 4,508,851 A | | 4/1985 | Izumi et al. ................ 502/426 |
| 5,021,164 A | * | 6/1991 | Gay ............................ 210/694 |
| 5,338,462 A | * | 8/1994 | Abe et al. .................... 210/757 |

(List continued on next page.)

FOREIGN PATENT DOCUMENTS

| EP | 0 206 579 | 12/1986 |
| EP | 0 663 370 | 7/1995 |

(List continued on next page.)

OTHER PUBLICATIONS

Chemical Abstracts, JP 62–063415, Mar. 20, 1987.
Chemical Abstracts, JP 54–162692, Dec. 24, 1979.
Chemical Abstracts, JP 9–225454, Sep. 2, 1997.

(List continued on next page.)

*Primary Examiner*—Mark L. Bell
*Assistant Examiner*—Patricia L. Hailey
(74) *Attorney, Agent, or Firm*—Oblon, Spivak, McClelland, Maier & Neustadt, P.C.

(57) ABSTRACT

The present invention provides an activated carbon produced by a process, which includes:
  activating a carbonaceous material, to obtain an activated carbonaceous material; and
  contacting the activated carbonaceous material with an acid.

Another embodiment of the present invention provides an electrode for an electric double-layer capacitor, which includes the above-described activated carbon. Another embodiment of the present invention provides a filter, which includes the above-described activated carbon. Another embodiment of the present invention provides a shaped article, which includes the above-described activated carbon. Another embodiment of the present invention provides a method for producing activated carbon, which includes activating a carbonaceous material, to obtain an activated carbonaceous material; and contacting the activated carbonaceous material with an acid, to obtain the activated carbon. The acid-processed activated carbon has a strong affinity for water, and is particularly suitable for water purification. Electrodes produced by shaping the acid-processed activated carbon have the advantage of large electrostatic capacity per the unit volume, and are particularly suitable for capacitors.

23 Claims, 5 Drawing Sheets

U.S. PATENT DOCUMENTS

| | | | | |
|---|---|---|---|---|
| 5,891,324 A | * | 4/1999 | Ohtsuka | 208/251 R |
| 5,891,822 A | | 4/1999 | Oyama et al. | 502/427 |
| 5,965,479 A | * | 10/1999 | Suzuki et al. | 502/182 |
| 6,060,424 A | * | 5/2000 | Alford | 502/416 |
| 6,225,256 B1 | * | 5/2001 | Shawabkeh et al. | 502/424 |

FOREIGN PATENT DOCUMENTS

| | | |
|---|---|---|
| JP | 1-139865 | 6/1989 |
| JP | 5-258996 | 10/1993 |
| JP | 7-161587 | 6/1995 |
| JP | 10-199767 | 7/1998 |
| WO | WO 91/12203 | 8/1991 |

OTHER PUBLICATIONS

Derwent Abstracts, AN 2000–337547, RU 2 131 767, Jun. 20, 1999.

Takeuchi et al, "Electrochemical Intercalation of Tetraethylammonium Tetrafluoroborate into KOH–Treated Carbon Consisting of Multi–Graphene Sheets for an Electric Double Layer Capacitor", Denki Kagaku, 66, No. 12, Aug. 1998.

Oda et al, "Formation of Porous Carbon Materials from Phenol–formaldehyde Resin and Their Adsorption Characteristics", Tanso 1997, No. 177, 76–79. Month Not Available.

* cited by examiner

ACTIVATED CARBON AND METHOD FOR PRODUCING IT

BACKGROUND OF THE INVENTION

1. Field of the Invention

The present invention relates to activated carbon and a method for producing it. More preferably, the invention relates to activated carbon obtained by activating a carbonaceous material followed by processing it with an acid, and to a method for producing it. The activated carbon of the invention has a strong affinity for water and is particularly suitable to water purification. In addition, as its electrostatic capacity is large, the activated carbon is also particularly suitable for electrodes for electric double-layer capacitors.

2. Description of the Related Art

Activated carbon is widely used in various fields such as the food industry, chemical industry and medicine industry, etc. The absorbability of activated carbon is useful in those fields wherein adsorbents having more absorbability are desired. In addition, and more recently, electric double-layer capacitors are becoming more important for backup power and power assist, and many developments concerning the capability of activated carbon for electrodes to electric double-layer capacitors are being made in the art. With the development of electronics, electric double-layer capacitors that contain polarizable electrodes of activated carbon are now in great demand, since their electrostatic capacity is large. Recently, such electric double-layer capacitors are used even in large-scale power assist devices, for example, in motors and the like, in addition to conventional systems such as back-up power sources for micro computer memories.

The principle of electric double-layer capacitors was known from the past, but their use in practical devices is relatively recent, and this use is increasing. The electrostatic capacity of electric double-layer capacitors is typically governed by the surface area of the polarizable electrodes therein to form electric double layers, by the electric double-layer capacity per unit surface area and the resistance of the electrodes. In the practical application of such electric double-layer capacitors it is important to increase the density of the electrodes therein for increasing their electrostatic capacity per unit volume and for reducing their volume. For electric double-layer capacitors, for example, heretofore used are (1) activated carbon prepared by activating a carbonaceous material of resin, coconut shell, pitch, coal or the like in an acidic condition, for example, In steam or acidic gas (see Technologies & Materials for EDLC, published by CMC in 1998); and (2) activated carbon prepared by activating the above starting materials with a chemical of high oxidizability, such as potassium hydroxide or the like (see WO91/12203, JP-A-199767/1998), etc.

Activating a carbonaceous material with an alkali compound and using it for polarizable electrodes for electric double-layer capacitors is known. For example, JP-A-139865/1989 discloses heating carbon fibers in an inert gas atmosphere at a temperature higher than 500° C. in the presence of an excessive amount of an alkali metal hydroxide to prepare carbon fibers having a large surface area. JP-A-258996/1993 discloses an electrode for electric double-layer capacitors, which is produced by activating carbon fibers (these are prepared by melt-spinning a starting material of pitch followed by heating the resulting fibers) with an aqueous solution of an alkali metal hydroxide, then deashing, grinding and shaping them into electrodes. JP-A-161587/1995 discloses an electrode for electric double-layer capacitors, which is produced by activating a carbonaceous material with steam and then with an alkali metal hydroxide followed by grinding and shaping it into electrodes.

As mentioned above, it is desirable to increase the absorbability of adsorbents and to increase the electrostatic capacity of electrodes for capacitors. However, the activated carbon produced in the above-described method (1) could not ensure high electrostatic capacity, and it must be in large devices in order to ensure the necessary electrostatic capacity. On the other hand, in the above-described method (2), the starting carbonaceous material is activated with an activator of high oxidizability, such as potassium hydroxide or the like at a high temperature. The activated carbon obtained therein could have high capacity in its degree, but it is still unsatisfactory for the recent requirement for higher capacity. The materials disclosed and proposed In JP-A-139865/1989, JP-A-258996/1993 and JP-A-161587/1995 are also not satisfactory.

SUMMARY OF THE INVENTION

Accordingly, one object of the present invention is to provide activated carbon having the advantage of high absorbability for impurities dissolved in water and the advantage of large electrostatic capacity, and to provide a method for producing it.

This and other objects have now been attained with the present invention, the first embodiment of which provides an activated carbon produced by a process, which includes:

activating a carbonaceous material, to obtain an activated carbonaceous material; and contacting the activated carbonaceous material with an acid.

Another embodiment of the present invention provides an activated carbon, having substantially the same IR spectrum as set out in FIG. 1.

Another embodiment of the present invention provides an activated carbon, having substantially the same IR spectrum as set out in FIG. 2.

Another embodiment of the present invention provides an activated carbon, having substantially the same IR spectrum as set out in FIG. 3.

Another embodiment of the present invention provides an activated carbon, which includes at least one IR absorption peak in the range of 1600 to 1800 $cm^{-1}$.

Another embodiment of the present invention provides an electrode for an electric double-layer capacitor, which includes the above-described activated carbon.

Another embodiment of the present invention provides a filter, which includes the above-described activated carbon.

Another embodiment of the present invention provides a shaped article, which includes the above-described activated carbon.

Another embodiment of the present invention provides a method for producing activated carbon, which includes activating a carbonaceous material, to obtain an activated carbonaceous material; and contacting the activated carbonaceous material with an acid, to obtain the activated carbon.

BRIEF DESCRIPTION OF THE FIGURES

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
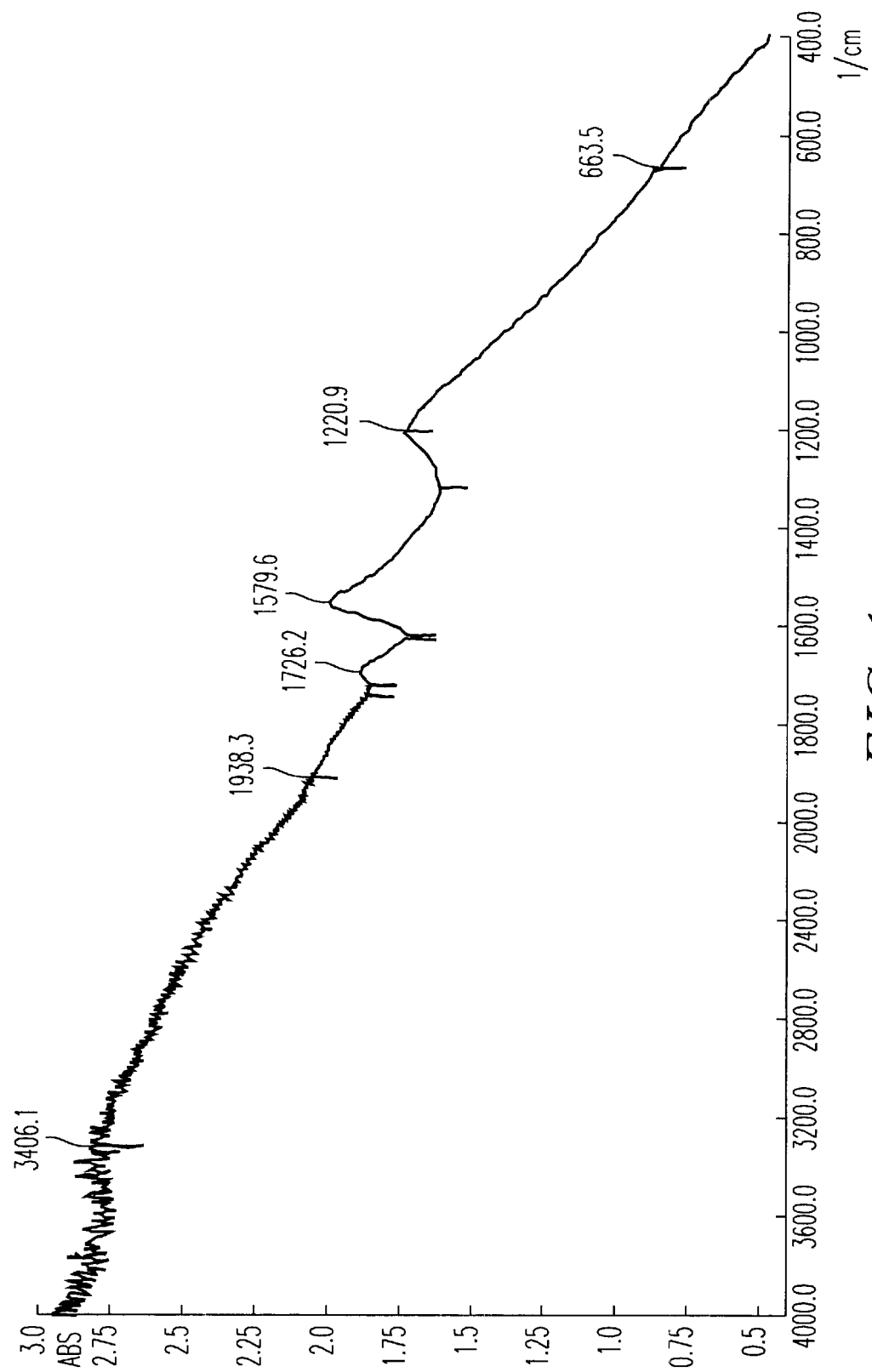
FIG. 1 is an IR absorption spectrum of one activated carbon of carbonaceous material BP-20 processed with sulfuric acid.

Various other objects, features and attendant advantages of the present invention will be more fully appreciated as the same becomes better understood from the following detailed description of the preferred embodiments of the invention.

One preferred embodiment of the present invention provides a method for activating a carbonaceous material followed by processing the resulting activated carbon with an acid at an elevated temperature, and an activated carbon produced therefrom. Another preferred embodiment of the invention is an activated carbon prepared by activating a carbonaceous material followed by processing it with an acid. Another preferred aspect is an electrode for electric double-layered capacitors, which is produced by shaping the activated carbon. Still another preferred aspect is a method for producing activated carbon, which includes activating a carbonaceous material followed by processing the resulting activated carbon with an acid at an elevated temperature.

The carbonaceous material for use in the invention is not specifically defined, and may be any and every one capable of being activated into activated carbon. Preferably, the carbonaceous material includes carbonaceous coconut shell, petroleum and/or coal pitch, cokes, phenolic resin, polyvinyl chloride, etc. Mixtures are possible. The morphology of the carbonaceous material is not specifically defined, including, for example granules, particulates, fibers, sheets, etc.

Preferred examples of the fibrous or sheet-like carbonaceous materials include natural cellulosic fibers such as cotton, etc. regenerated cellulosic fibers such as viscose rayon, polynosic rayon, etc.; pulp fibers; synthetic fibers such as polyvinyl alcohol fibers, polyethylene-vinyl alcohol fibers, etc., as well as woven fabrics, non-woven fabrics, films, felts and sheets of such fibers.

Activated carbon can be prepared by activating the carbonaceous material. For activating it, any known method is employable. Preferably, the carbonaceous material may be activated with an oxidizable chemical, such as zinc chloride, phosphoric acid, sulfuric acid, calcium chloride, sodium hydroxide, potassium bichromate, potassium permanganate or the like (chemical activation); or with steam, propane gas, exhaust gas generated from combustion gas which is a mixture of $CO_2$ and $H_2O$, carbon dioxide gas or the like (gas activation).

Preferably, however, the carbonaceous material is activated with an alkali (alkali activation) as the resulting activated carbon can ensure higher electrostatic capacity. For such alkali activation, any known method is suitable. A preferable method is described, for example, in Denki Kagaku, 12 (1998), pp. 1311–1317; Tanso, 177 (1997), pp. 76–79, etc, the entire contents of each of which are hereby incorporated by reference. The alkali includes, for example, alkali metal hydroxides such as sodium hydroxide, potassium hydroxide, etc.; alkaline earth metal hydroxides such as calcium hydroxide, magnesium hydroxide, etc. Especially preferred sodium hydroxide and potassium hydroxide. The amount of the alkali to be used preferably falls between 0.01 and 10 parts by weight, relative to 100 parts by weight of the carbonaceous material to be processed with it, but is more preferably from 0.1 to 10 parts by weight in view of the operaility and the safety of the process. These ranges include all values and subranges therebetween, including 0.5, 1, 2, 3, 4, 5, 6, 7, 8 and 9 parts by weight.

Preferably, the activated carbon is processed with an acid at an elevated temperature. The acid preferably includes mineral acids such as concentrated sulfuric acid, fuming sulfuric acid, diluted nitric acid, phosphoric acid, polyphosphoric acid, pyrophosphoric acid, metaphosphoric acid, etc., sulfonic acids such as methanesulfonic acid, ethane sulfonic acid, benzene sulfonic acid, toluene sulfonic acid, etc. Especially preferred are concentrated sulfuric acid, phosphoric acid and polyphosphoric acid. More preferred is polyphosphoric acid. In general, one of these acids is used alone, but they may be combined in any desired manner for acid treatment.

In case where the carbonaceous material is activated using known chemical activation or gas activation methods with any of steam, propane gas, exhaust gas generated from combustion gas which is a mixture of $CO_2$, and $H_2O$, carbon dioxide gas or the like, and not in alkali activation, the resulting activated carbon may be processed with an aqueous solution of sulfuric acid, phosphoric acid or the like. In that case, the acid concentration for the treatment may fall between 0.01 and 100% by weight, but preferably falls between 0.1 and 80% by weight in view of the reaction efficiency, the operability and the safety of the process, more preferably between 0.5 and 60% by weight. In case where the activated carbon is processed with diluted nitric acid, it is desirable that the concentration of the aqueous solution of the acid falls between 5 and 20% by weight. These ranges include all values and subranges therebetween, including 0.5%, 1%, 3%, 10%, 15%, 25%, 45%, 55%, 75%, 85% and 95%.

The amount of the acid to be used for the treatment may fall between 0.01 and 100 times by weight of the activated carbon to be processed with it, but preferably falls between 0.1 and 50 times by weight In view of the reaction efficiency. the operability and the safety of the process, more preferably between 0.5 and 20 times by weight. These ranges include all values and subranges therebetween, including 0.75, 1, 10, 25, 30, 40, 60, 70, 80 and 90. The processing temperature may vary depending on the type of the acid used, and preferably cannot be determined indiscriminately. Most preferably, however, the acid-processing temperature is lower than the temperature for activation but is higher than room temperature, for example, falling between 30° C. and 500° C., more preferably between 40° C. and 300° C. These ranges include all values and subranges therebetween, including 50° C., 75° C., 100° C., 150° C., 175° C., 200° C., 250° C., 350° C., 400° C. and 450° C. The acid treatment may be effected in an air atmosphere, but is preferably effected in an inert gas atmosphere of, for example, nitrogen, argon or the like for safety. The treatment may be effected under any pressure, but is most preferably effected under atmospheric pressure.

The acid-processed activated carbon is put into water to remove the acid from it. Washing it with water is enough for the acid removal. In case where the excessive acid still remaining therein has some influence on the capability of the activated carbon, it may be removed through neutralization. After the acid has been removed, the activated carbon is dried at room temperature or under heat under atmospheric pressure and/or reduced pressure. However, in case where the activated carbon is formed into electrodes, too much drying it in this stage is meaningless. In that case, therefore, the activated carbon will be dried in some degree not interfering with its capability for electrodes.

Figure 2:
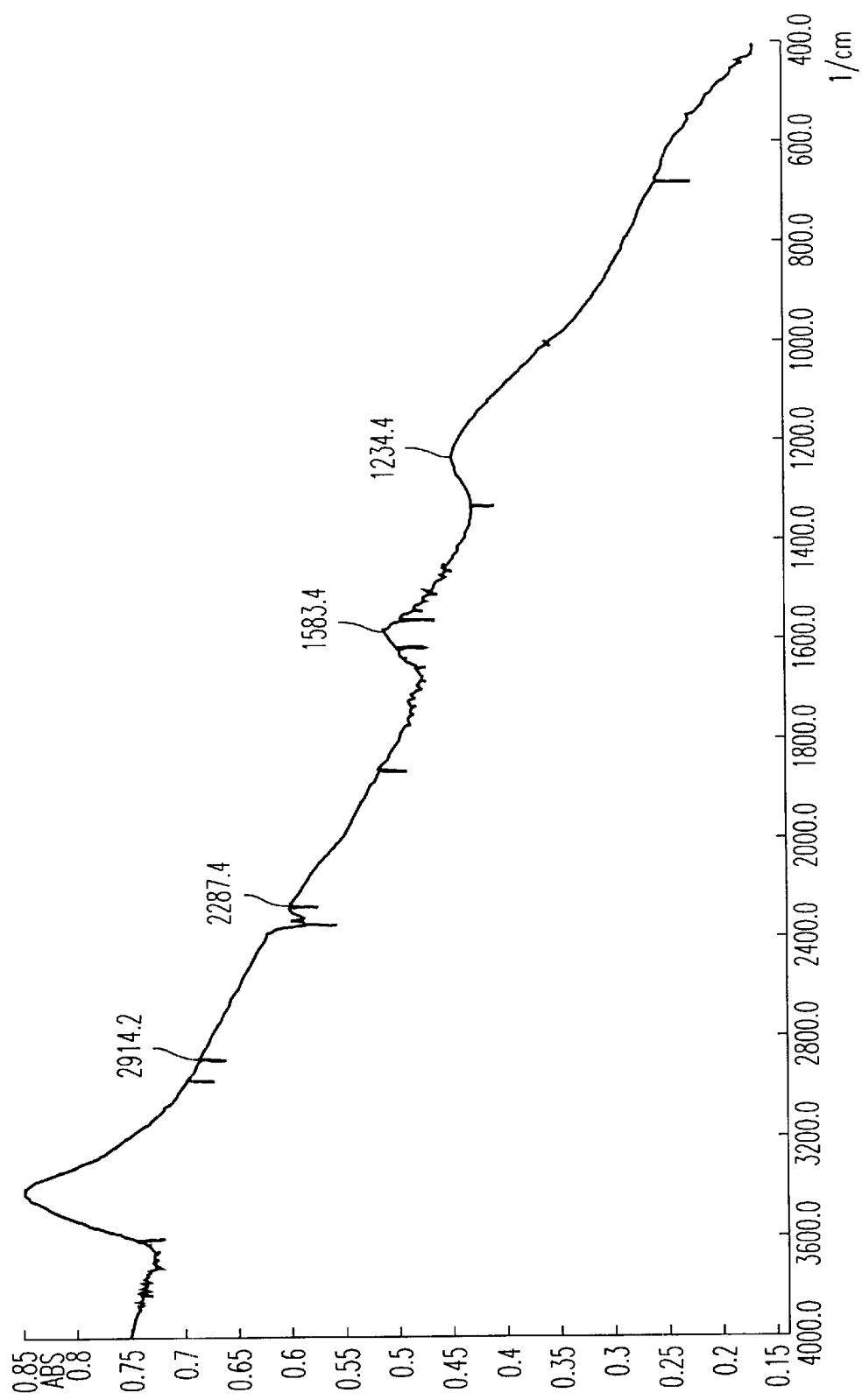
FIG. 2 is an IR absorption spectrum of another activated carbon of a carbonaceous material BP-20 processed with sulfuric acid.
Figure 3:
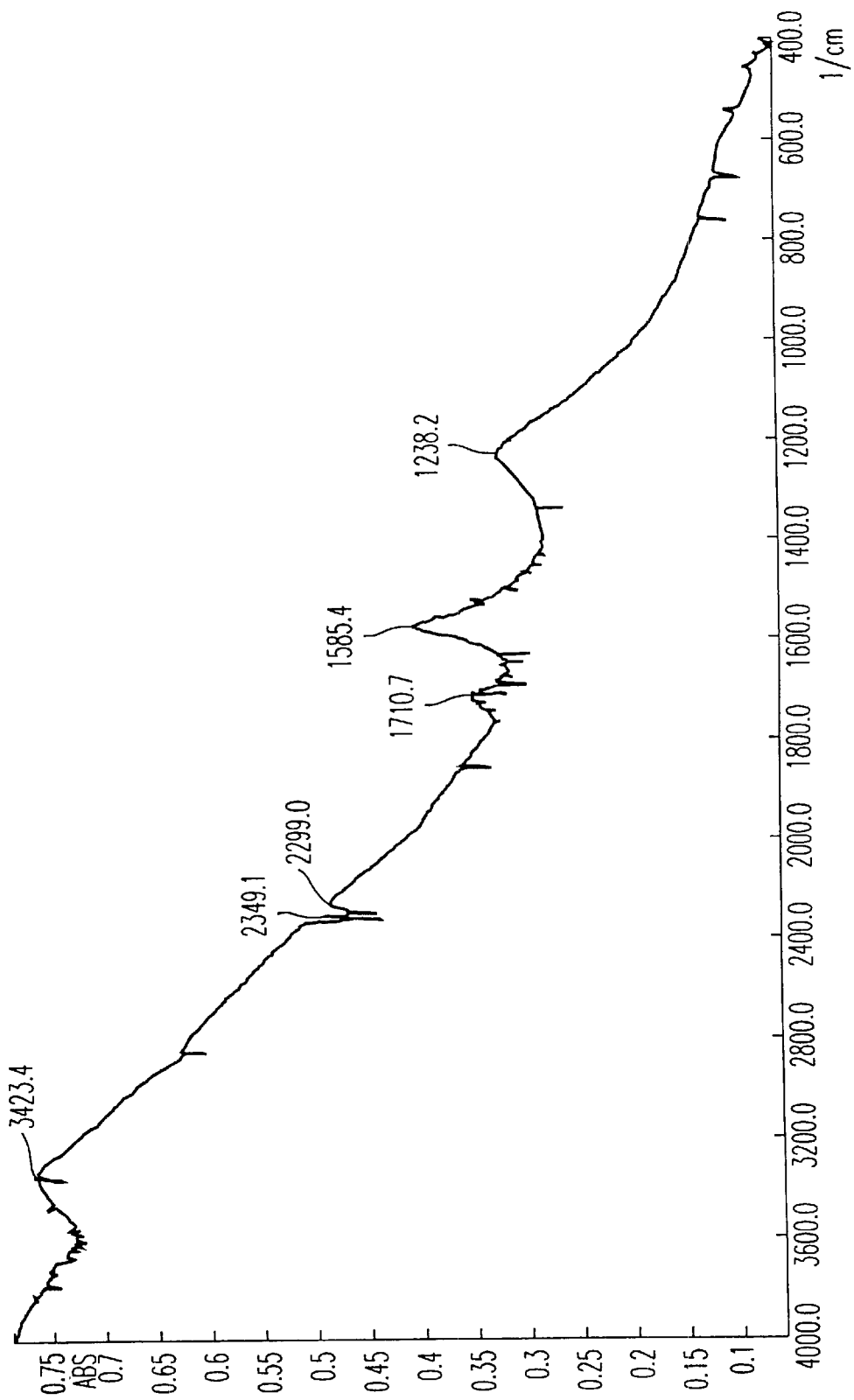
FIG. 3 is an IR absorption spectrum of one activated carbon of a carbonaceous material BP-20 processed with 10% nitric acid.
Figure 4:
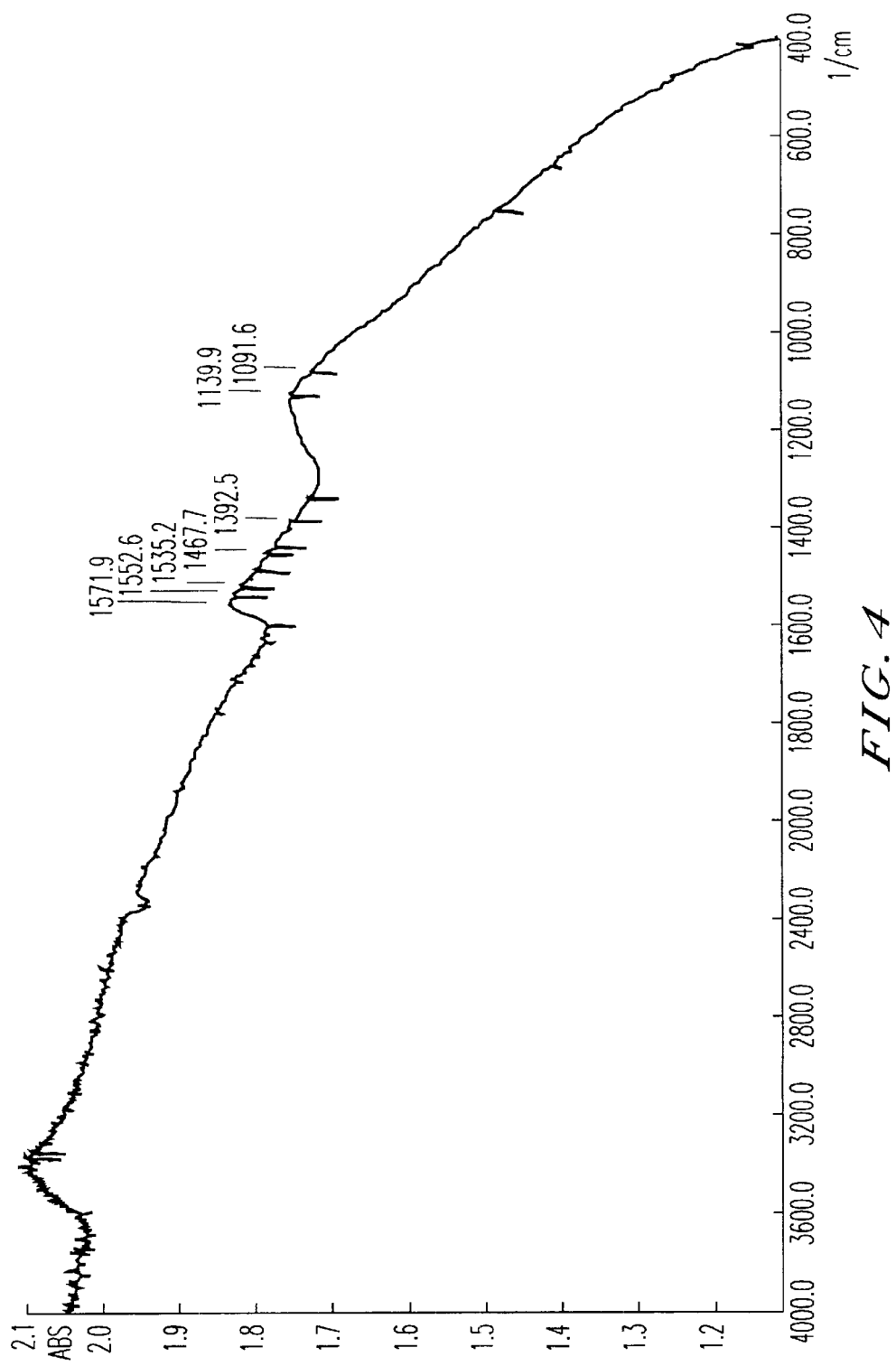
FIG. 4 is an IR absorption spectrum of a carbonaceous material BP-20.

Preferably, the activated carbon of the invention shows an absorption peak in a range of from 1600 to 1800 cm$^{-1}$ in its IR spectra. Anyone of ordinary skill in the art can determine the presence of an absorption peak in this range, and this range includes all values and subranges therebetween, including 1625, 1650, 1675, 1700, 1705, 1710, 1715, 1720, 1725, 1730, 1750 and 1775 cm$^{-1}$. For IR spectrometry of the activated carbon, employable is any known method including, for example, a powder or solid reflection method, a liquid paraffin dispersion method, a KBr tablet method (hereinafter referred to as a KBr method), etc. The amount of the activated carbon for its IR spectrometry is not specifically defined, so far as IR rays can pass through it. Preferably, the concentration of the activated carbon in the KBr method falls between 0.001 and 10% by weight, relative to KBr, more preferably between 0.01 and 5% by weight, and most preferably between 0.05 and 2% by weight. These ranges include all values and subranges therebetween, including 0.01%, 0.5%, 1%, 1.5% and 1.75%. FIG. 1 is an IR absorption spectrum of the activated carbon of Example 3 to be mentioned below; FIG. 2 is an IR absorption spectrum of the activated carbon of Example 5; FIG. 3 is an IR absorption spectrum of an activated carbon having been processed with 10% nitric acid at 120° C. for 6 hours; and FIG. 4 is an IR absorption spectrum of an activated carbon of phenolic resin (Kuraray Chemical's BP-20) not processed with an acid.

Preferably, the present invention provides an activated carbon having substantially the same IR spectra set out in the Figures. The term substantially is preferably taken to mean that the IR spectra is substantially the same as that in the range of 1600 to 1800 cm$^{-1}$. Most preferably, the present invention provides an activated carbon having an IR spectrum with absorption peaks in the range of 1600 to 1800 cm$^{-1}$.

The activated carbon obtained herein has a strong affinity for water. Directly or after having been shaped, it may be used for treating water in water purifiers in which it acts to remove minor harmful substances such as free chlorine, trihalomethanes, chloroform and others from water. For capacitors, it is preferably shaped into electrodes. For shaping the activated carbon into electrodes, employable is any known method. Preferably, the activated carbon, optionally after mixing well with up to a few % of commercially-available polytetrafluoroethylene or the like as a binder, is molded in a mold under pressure, or rolled into sheets and stamped out into electrodes having a desired shape. In the process, the activated carbon may be heated, if desired. However, heating it too much is undesirable, since the binder optionally mixed with it will be degraded and, in addition, the physical properties of the activated carbon intrinsic to the surface structure thereof, for example, the relative surface area thereof will be negatively influenced by such high-temperature heat treatment. Needless-to-say, therefore, special attention should be paid to the temperature condition in the process such that the temperature does not affect the desired properties of the activated carbon.

Figure 5:
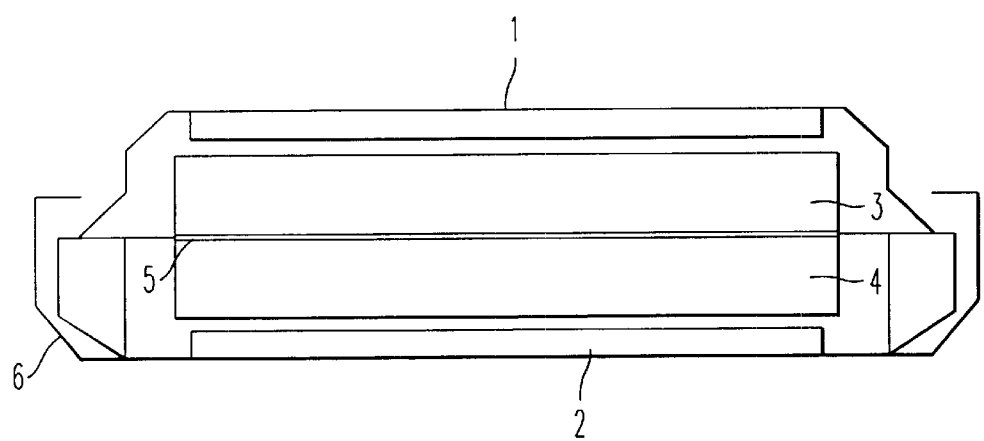
FIG. 5 is a schematic view showing the outline of one embodiment of a capacitor in which the electrodes are made of the activated carbon of the invention. In this, 1 indicates a collector, 2 indicates a collector, 3 indicates a polarizable electrode, 4 indicates a polarizable electrode, 5 indicates a separator, and 6 Indicates a cover.

Preferably, before or while the activated carbon is shaped, an electroconductive substance such as electroconductive carbon, fine metal particles or the like may be added thereto to lower the resistance of the electrodes to be produced. Adding such an electroconductive substance to the activated carbon is effective for lowering the internal resistance of polarizable electrodes to be produced and for reducing the volume of the electrodes. The electrodes thus produced are preferably installed in electric double-layer capacitors which are for practical use. The outline of one preferred embodiment of the capacitor is shown in FIG. 5, in which 1 and 2 are collectors, 3 and 4 are polarizable electrodes comprising the activated carbon of the invention, 5 is a separator made of a non-woven polypropylene fabric or the like, and 6 is a cover made of a stainless material or the like.

EXAMPLES

Having generally described this invention, a further understanding can be obtained by reference to certain specific examples which are provided herein for purposes of illustration only and are not intended to be limiting unless otherwise specified.

Reference Example 1

10 g of coconut shell carbon (Kuraray Chemical's YP-17) that had been activated in a exhaust gas generated from combustion gas which is a mixture of $CO_2$ and $H_2O$ atmosphere was put into a three-neck flask equipped with a thermometer and a stirrer, to which was added 20 g of concentrated sulfuric acid. With that, the flask was purged with nitrogen. With its contents being stirred, the flask was put into an oil bath heated at 200° C., and its contents were kept stirred for 2 hours. The resulting mixture was poured into 500 g of water with ice. The thus-processed, activated carbon was well dispersed therein, then taken out through filtration, and washed with 2 liters of ion-exchanged water. After thus washed, the activated carbon was dried under heat at 100° C. under reduced pressure. Its weight was 10.7 g.

Reference Example 2

10 g of coal pitch (ADCHEMCO's PM-BL) and 85% potassium hydroxide were put into a 2-inch Hastelloy reactor equipped with a thermometer and a stirrer. The reactor was purged with nitrogen, and its contents were heated up to 700° C. in a nitrogen stream atmosphere at a heating rate of 200° C./hr. At 700° C., this was kept stirred for 2 hours, and then cooled to room temperature over a period of 2 hours. Nitrogen having been passed through a distilled water bubbler was kept introduced into the reactor for 1 hour, and the mixture in the reactor was neutralized with aqueous 10% hydrochloric acid, and then washed with distilled water to remove the salts. After dried, 6.8 g of pitch carbon was obtained.

6 g of the pitch carbon was put into a three-neck flask, to which was added 20 g of concentrated sulfuric acid. With that, the flask was purged with nitrogen. With its contents being stirred, the flask was put into an oil bath heated at 200° C., and its contents were kept stirred for 2 hours. The resulting mixture was poured into 500 g of water with ice. The thus-processed, activated carbon was well dispersed therein, then taken out through filtration, and washed with 2 liters of ion-exchanged water. After thus washed, this was dried under heat at 100° C. under reduced pressure. The weight of the thus-processed, activated pitch carbon was 5.8 g.

Reference Example 3

Carbonaceous phenolic resol resin (Showa Polymer's BBL141B) and not coal pitch was processed in the same manner as in Reference Example 2. Herein obtained was 4.1 g of acid-processed, activated phenolic resin carbon.

Reference Example 4

50 g of sulfuric acid and 20 g of non-woven fabric of activated carbon (Kuraray Chemical's ACF) were put into a glass vat, in which the non-woven fabric was thus dipped in sulfuric acid for 30 minutes at room temperature. After thus dipped, the non-woven fabric was taken out of the vat and left as it was for 30 minutes to remove the liquid from it. Next, this was dried in a nitrogen stream atmosphere for 3.5 minutes and then in a drier furnace under heat at 220° C. for 15 minutes. The thus-dried, non-woven fabric of activated carbon was put into 200 g of pure water and the acid was removed from it. This treatment was repeated three times, and it was confirmed that the pure water used was not acidic. The thus-processed non-woven fabric was dewatered, and dried in a hot air drier at 50° C., and then further dried in vacuum at the same temperature for 10 hours. Thus processed with sulfuric acid and dried, the weight of the non-woven fabric of activated carbon was 19.3 g.

Example 1

Comparative Example 1

200 g of the activated carbon obtained in Reference Example 1 was packed into a cylindrical container having an inner diameter of 40 mm and a length of 90 mm. On the other hand, 2 ppm, in terms of the free chlorine concentration, of sodium hypochlorite was added to river water having a total organic carbon (TOC) concentration of 2.5 $\mu$m. To this were added chloroform, bromoform, bromodichloromethane and dibromochloromethane of 50 ppb, 20 ppb, 20 ppb and 20 ppb, respectively, to prepare test water. The thus-prepared test water was passed through the container at a flow rate, space velocity (SV) of 600 $hr^{-1}$, for 2 hours. Thus processed, the test water was analyzed according to JIS K-0125 to measure the amount of chloroform and the total amount of the four trihalomethanes therein. The amount of chloroform therein was not larger than 2 ppb, and the total amount of the trihalomethanes was not larger than 8 ppb. For comparison, the same test water was passed through the coconut shell carbon (Kuraray Chemical's YP-17) not processed with acid, and analyzed in the same manner as above. The amount of chloroform therein was 50 ppb, and the total amount of the trihalomethanes was 90 ppb.

Example 2

The activated carbon obtained in Reference Example 1 was ground into activated carbon powder having a mean particle size of from 5 to 20 pm. A mixture of 80% by weight of the activated carbon powder, 10% by weight of electroconductive carbon and 10% by weight of polytetrafluoroethylene was prepared by kneading them. Next, the mixture was rolled Into a sheet having a thickness of 300 $\mu$m, and stamped out into circular discs having a diameter of 2 cm. The discs were dried at 150° C. under reduced pressure for 4 hours. These serve as sheet electrodes.

In a glow box having a dew point of not higher than −80° C., a collector electrode, a polarizable electrode sheet of the disc, a non-woven polypropylene fabric, a polarizable electrode sheet of the disc, and a collector electrode were laminated in that order on a stainless cover as shown in the FIG. 5, and a propylene carbonate solution containing 1 mol of tetraethylammonium tetrafluoroborate was infiltrated into the polarizable electrodes. With that, the stainless cover was sealed with an insulating gasket of polypropylene. Using a Hioki Electric's double-layer capacitor tester, the electric double-layer capacitor thus fabricated herein was tested to measure its electrostatic capacity. Briefly, it was subjected to 10 charge-discharge cycles at room temperature, to which the constant current applied was up to 2.5 V. The mean value of the electrostatic capacity of the capacitor was read on the discharge curve obtained In the test, and it was 15.4 F/cc.

Examples 3 to 10, Comparative Examples 2 and 3.

Activated carbon of phenolic resin (Kuraray Chemical's BP-20) was processed with an acid in the same manner as in Reference Example 1 (Examples 3 to 5, 7, 8 and 10). Activated carbon YP-17 was processed with an acid also in the same manner as in Reference Experiment Example 1 (Examples 6 and 9). Activated carbons, BP-20 and YP-17 not processed with an acid are Comparative Examples 2 and 3, respectively. These were tested for electrostatic capacity and analyzed through IR spectrometry, and their data obtained are given in Table 1. The IR spectra of the activated carbons of Example 3, Example 5, Example 10, and Comparative Example 2 are given in FIGS. 1, 2, 3 and 4, respectively.

To obtain the IR spectra, a KBr method was used as follows: a mixture of 10 mg of activated carbon and 1 g of KBr was molded into a tablet under a pressure of 1000 $kg/cm^2$ for an hour in a press-forming machine. The tablet obtained thereby was analyzed by infrared absorption spectroscopy.

TABLE I

|  | Carbonacous Material | Acid Treatment | Electrostatic Capacity (F/cc) | IR Peak in KBr Method ($cm^{-1}$) |
|---|---|---|---|---|
| Example 2 | YP-17 | sulfuric acid, 200° C. × 2 hrs | 15.4 | 1715 |
| Example 3 | BP-20 | sulfuric acid, 200° C. × 2 hrs | 16.7 | 1710 |
| Example 4 | BP-20 | sulfuric acid, 100° C. × 2 hrs | 15.8 | 1711 |
| Example 5 | BP-20 | sulfuric acid, 250° C. × 2 hrs | 17.1 | 1726 |
| Example 6 | YP-17 | polyphosphoric acid, 140° C. × 2 hrs | 15.0 | 1715 |
| Example 7 | BP-20 | polyphosphoric acid, 140° C. × 2 hrs | 16.5 | 1720 |

TABLE I-continued

|  | Carbonacous Material | Acid Treatment | Electrostatic Capacity (F/cc) | IR Peak in KBr Method (cm$^{-1}$) |
|---|---|---|---|---|
| Example 8 | BP-20 | phosphoric acid, 200° C. × 2 hrs | 15.6 | 1720 |
| Example 9 | YP-17 | aqueous 10% nitric acid, 120° C. × 6 hrs | 15.0 | 1720 |
| Example 10 | BP-20 | aqueous 10% nitric acid, 120° C. × 6 hrs | 16.5 | 1710 |
| Comp. Example 2 | BP-20 | not treated | 14.1 | 1580 |
| Comp. Example 3 | YP-17 | not treated | 12.7 | 1550 |

Example 11

The Pitch corban processed in Reference Example 2 was tested for electrostaic capacity and anyalyzed through IR spectromery, in the same manner as in Example 2. Its data obtained are in Table 1.

Examples 12 to 14

The carbonaceous materials in Reference Example 2 and 3 were processed with an acid under the condition indicated in Table 2 below. Thus processed, the activated carbons were tested for electrostaic capacity and analyzed through IR spectromery, in the same manner as in Example 2. Their data obtained in Table 2.

Comparative Examples 4 and 5

Not processed with an acid, pitch coal were tested for electrostaic capacity and analyzed through IR spectromery, in the same manner as in Example 2. Their data obtained are given in Table 2.

Example 15

The non-woven fabric of activated carbon obtained in Reference Example 4 was stamped out into circular discs having a diameter of 2 cm. The discs were dried at 150° C. under reduced pressure for 4 hours. These serve as sheet electrodes. In a glow box having a dew point of not higher than −80° C., a collector electrode 2, a polarizable electrode sheet of the disc 4, a non-woven polypropylene fabric 5, a polarizable electrode sheet of the disc 3, and a collector electrode 1 were laminated in that order on a stainless cover 6, as in FIG. 5. and a propylene carbonate solution containing 1 mol of tetraethylammonium tetrafluoroborate was infiltrated into the polarizable electrodes. With that, the stainless cover was sealed with an insulating gasket of polypropylene. Using a Hioki Electric's double-layer capacitor tester, the electric double-layer capacitor thus fabricated herein was tested to measure its electrostatic capacity. Briefly, it was subjected to 10 charge-discharge cycles at room temperature, to which the constant current applied was up to 2.5 V. The mean value of the electrostatic capacity of the capacitor was read on the discharge curve obtained in the test, and it was 40.1 F/g. The activated carbon used herein was analyzed through IR spectrometry, and its IR peak is given in Table 3 below.

Example 16

Polarizable electrodes were produced in the same manner as in Example 15. In this, however, the non-woven fabric of activated carbon was processed with phosphoric acid. The activated carbon was tested for electrostatic capacity and analyzed through IR spectrometry. Its data obtained are given in Table 3.

Example 17

Polarizable electrodes were produced in the same manner as in Example 15. In this, however, the non-woven fabric of activated carbon processed with sulfuric acid was dried at 200° C. for 2 hours. The activated carbon was tested for electrostatic capacity and analyzed through IR spectrometry. Its data obtained are given In Table 3.

Comparative Example 6

Polarizable electrodes were produced from the non-woven fabric of activated carbon not processed with an acid. The activated carbon was tested for electrostatic capacity and analyzed through IR spectrometry. Its data obtained are given in Table 3.

TABLE 2

|  | Carbonaceous Material | Acid Treatment | Electrostatic Capacity (F/cc) | IR Peak in KBr Method (cm$^{-1}$) |
|---|---|---|---|---|
| Example 11 | pitch coal | sulfuric acid, 200° C. × 2 hrs | 24.0 | 1720 |
| Example 12 | resin coal | sulfuric acid, 200° C. × 2 hrs | 21.2 | 1715 |
| Example 13 | pitch coal | polyphosphoric acid, 140° C. × 2 hrs | 24.3 | 1718 |
| Example 14 | resin coal | polyphosphoric acid, 140° C. × 2 hrs | 20.1 | 1720 |
| Comp. Example 4 | pitch coal | not treated | 22.0 | 1550 |
| Comp. Example 5 | resin coal | not treated | 19.1 | 1575 |

TABLE 3

| | Carbonacous Material | Acid Treatment | Electrostatic Capacity (F/cc) | IR Peak in KBr Method (cm$^{-1}$) |
|---|---|---|---|---|
| Example 15 | ACF | sulfuric acid, 220° C. × 15 min | 40.1 | 1715 |
| Example 16 | ACF | sulfuric acid, 220° C. × 15 min | 38.3 | 1718 |
| Example 17 | ACF | sulfuric acid, 200° C. × 2 hrs | 39.2 | 1720 |
| Comp. Example 6 | ACF | not treated | 31.1 | 1530 |

According to the present invention, there is obtained activated carbon having a strong affinity for and having a large eleatrostatic capacity. The activated carbon is favorable to water treatment. After shaping, it is particularly suitable for electrodes for capacitors.

This application is based on Japanese patent applications 325279/1999, filed Nov. 16, 1999; 329857/1999, filed Nov. 19, 1999; 75809/2000, filed Mar. 17, 2000; and 221784/2000, filed Jul. 24, 2000, the entire contents of each of which are hereby incorporated by reference, the same as if set forth at length.

Having now fully described this invention, it will be apparent to one of ordinary skill in the art that many changes and modifications can be made thereto without departing from the spirit or scope of the invention as set forth herein.

What is claimed is:

1. An activated carbon produced by a process comprising:
   activating a carbonaceous material, to obtain an activated carbonaceous material; and
   contacting said activated carbonaceous material with an acid at a temperature greater than 100° C. and less than 500° C.

2. The activated carbon according to claim 1, wherein said activating comprises at least one selected from the group consisting of chemical activation, gas activation, and alkali activation, and combinations thereof.

3. The activated carbon according to claim 1, wherein said activating comprises chemical activation by contacting said carbonaceous material with at least one selected from the group consisting of oxidizable chemical, zinc chloride, phosphoric acid, sulfuric acid, calcium chloride, sodium hydroxide, potassium bichromate, potassium permanganate, and combinations thereof.

4. The activated carbon according to claim 1, wherein said activating comprises gas activation by contacting said carbonaceous material with at least one selected from the group consisting of steam, propane gas, exhaust gas generated from combustion gas which is a mixture of $CO_2$ and $H_2O$, carbon dioxide gas, and combinations thereof.

5. The activated carbon according to claim 1, wherein said activating comprises alkali activation by contacting said carbonaceous material with at least alkali selected from the group consisting of alkali metal hydroxide, sodium hydroxide, potassium hydroxide, alkaline earth metal hydroxide, calcium hydroxide, magnesium hydroxide, and combinations thereof.

6. The activated carbon according to claim 1, wherein said activating comprises alkali activation by contacting said carbonaceous material with at least one alkali, and wherein the alkali is present in an amount of between 0.01 and 10 parts by weight, relative to 100 parts by weight of the carbonaceous material.

7. The activated carbon according to claim 1, wherein said carbonaceous material is at least one selected from the group consisting of carbonaceous coconut shell, petroleum pitch, coal pitch, coke, phenolic resin, polyvinyl chloride, and combinations thereof.

8. The activated carbon according to claim 1, wherein said acid is selected from the group consisting of mineral acid, sulfuric acid, concentrated sulfuric acid, fuming sulfuric acid, nitric acid, diluted nitric acid, phosphoric acid, polyphosphoric acid, pyrophosphoric acid, metaphosphoric acid, sulfonic acid, methanesulfonic acid, ethane sulfonic acid, benzene sulfonic acid, toluene sulfonic acid, and combinations thereof.

9. The activated carbon according to claim 1, comprising an IR absorption peak in the range of 1600 and 1800 cm$^{-1}$.

10. The activated carbon according to claim 1, wherein said temperature is greater than 150° C. to less than 500° C.

11. The activated carbon according to claim 1, wherein said temperature is greater than 175° C. to less than 500° C.

12. The activated carbon according to claim 1, wherein said temperature is greater than 250° C. to less than 500° C.

13. The activated carbon according to claim 1, wherein said temperature is greater than 250° C. to less than 450° C.

14. An electrodse for an electric double-layer capacitor, comprising the activated carbon according to claim 1.

15. A filter, comprising the activated carbon according to claim 1.

16. A shaped article, comprising the activated carbon according to claim 1.

17. A method for producing activated carbon, comprising:
   activating a carbonaceous material, to obtain an activated carbonaceous material; and
   contacting said activated carbonaceous material with an acid at a temperature greater than 100° C. and less than 500° C., to obtain said activated carbon.

18. The method according to claim 17, further comprising contacting said activated carbon with water.

19. The method according to claim 17, further comprising drying said activated carbon.

20. The method according to claim 17, wherein said temperature is greater than 150° C. to less than 500° C.

21. The method according to claim 17, wherein said temperature is greater than 175° C. to less than 500° C.

22. The method according to claim 17, wherein said temperature is greater than 250° C. to less than 500° C.

23. The method according to claim 17, wherein said temperature is greater than 250° C. to less than 450° C.

* * * * *